United States Patent [19]

Kraus

[11] Patent Number: 5,452,992
[45] Date of Patent: Sep. 26, 1995

[54] TUBULAR SHAFT FOR A TUBULAR-TYPE PUMP

[75] Inventor: Norbert Kraus, Pegnitz, Germany

[73] Assignee: KSB Aktiengesellschaft, Frankenthal, Germany

[21] Appl. No.: 184,235

[22] Filed: Jan. 19, 1994

[30] Foreign Application Priority Data

Jan. 19, 1993 [DE] Germany .......................... 43 01 176.4

[51] Int. Cl.[6] .................................................. F04B 35/04
[52] U.S. Cl. ..................... 417/360; 417/423.3; 166/105
[58] Field of Search .................................. 417/360, 361, 417/423.3, 423.15, 424.1; 166/105

[56] References Cited

U.S. PATENT DOCUMENTS

| | | |
|---|---|---|
| 3,720,488 | 3/1973 | Bood . |
| 3,973,868 | 8/1976 | Weisser ..................... 417/360 |
| 4,080,106 | 3/1978 | Haeslop .................... 417/360 |
| 4,889,468 | 12/1989 | Ishikura .................... 417/358 |

FOREIGN PATENT DOCUMENTS

| | | |
|---|---|---|
| 1842295 | 3/1961 | Germany . |
| 7537699 | 4/1976 | Germany . |
| 3023428A1 | 1/1982 | Germany . |
| 8411983.7 | 4/1984 | Germany . |
| 3403079C1 | 6/1984 | Germany . |
| 3423184A1 | 6/1984 | Germany . |
| 8411983U1 | 7/1984 | Germany . |
| 8807280U1 | 9/1988 | Germany . |
| 2908163C2 | 3/1989 | Germany . |

*Primary Examiner*—Richard A. Bertsch
*Assistant Examiner*—Charles G. Freay
*Attorney, Agent, or Firm*—Darby & Darby

[57] ABSTRACT

An assembly comprises a tubular shaft that has a first axial end and a second axial end. A tubular pump is housed within the shaft and is driven by an electric motor. A lid is detachably connected to the first axial end of the shaft. At least one line is connected to the electric motor. The tubular shaft has an opening adjacent to the first axial end. A u-shaped frame is disposed within the opening such that an open part of the frame faces the first axial end. The at least one line is disposed within the frame to form a fluid tight seal about the first end and the at least one line.

6 Claims, 2 Drawing Sheets

TUBULAR SHAFT FOR A TUBULAR-TYPE PUMP

FIELD OF THE INVENTION

The present invention relates to a tubular shaft to accommodate a tubular-type pump. More specifically, the present invention relates to a tubular shaft to accommodate a tubular-type pump having an electric motor. A lid covers the shaft and is closed pressure-tight. A pressure-tight conduit for one or more lines connected to the electric motor of the tubular-type pump passes through an opening in the shaft.

BACKGROUND OF THE INVENTION

A tubular shaft which accommodates a tubular-type pump has a section situated above the pump that is a pressure line for the tubular-type pump. Accordingly, this section requires a pressure-tight seal about the openings through which the pump is lowered into the tubular shaft, and through which the lines leading to the electric motor of the tubular-type pump penetrate from and exit the tubular shaft. The lines and a carrying cable or carrying chain which may be permanently attached to the pump are exposed to the pressurized flow of the tubular-type pump. For this reason, they must be fastened as tightly as possible to forestall hindrances to the operation or damage due to motion in the pressurized fluid flow. When the tubular-type pump is lowered, care must be taken first to ensure that the pump is solidly seated on a support in the tubular shaft. The carrying cable or chain and the lines consequently can be tightened only after the pump has been lowered. On the other hand, when the tubular-type pump is pulled up, the carrying cable or chain and the lines must be relieved of tension and must be prepared for the subsequent processing.

The above circumstances necessitate a special design of the openings for passing the pump and the lines as well as a special design of the fastening point for the traction cable or chain. Here one must take into account that under certain circumstances, the motors used are sometimes very powerful and consequently lines with a large cross section are used, which can make it quite difficult to handle the lowering and lifting of the tubular-type pumps. The line conduits consequently are especially important.

It is indeed possible to lead the lines through the tubular shaft; however, because of the required bending radii of these lines, the tubular-type pump then cannot be pulled up without previously clamping and threading out the lines. This is quite complicated because the lines are so thick.

DE-GM 84 11 983 discloses a tubular shaft for accommodating submersible motor-driven pumps disposed therein. A two-part lid is used, such that only one part has penetrations for the lines. The two lid-segments can be of different size and are sealed with respect to one another and with respect to the tubular shaft. They can be detached from the tubular shaft independently of one another. In this way it is possible first to lower the pump into the tubular shaft and for bringing the lines into their operational state through the remaining opening. However, this solution is quite complicated. Furthermore, it requires skill and practice on the part of the personnel for the initial assembly and for the periodic maintenance work.

SUMMARY OF THE INVENTION

It is an object of the invention to create a tubular shaft whose lid and line penetrations have a simple design and require little effort for assembly and disassembly when inserting and withdrawing the tubular-type pump.

According to the invention, this object is achieved by the upper end of the shaft wall having an opening into which is inserted the lower, open part of a frame, while the upper part, which closes the frame, is fastened separately, such that the lines and the means which surround the lines can be inserted into the open part of the frame so as to make a fluid tight seal.

The present invention permits the use of an integral lid with a simple design, which presents no problems as regards to sealing or assembly and disassembly. When the lid is raised, the lines and the sealing means surrounding these lines can easily be placed into the open frame. Also, when the lid is raised, the system is disassembled simply by lifting out the lines and the means surrounding these lines.

In a preferred embodiment of the invention, the part which closes the frame is formed by the lid of the tubular shaft itself. Additionally, if an unwieldy thick cable is involved, a press plate may be used, which is disposed below a flange gasket for sealing the lid and a closure gasket of the frame. To tighten this plate, one or more set screws, disposed in the lid may be used.

The present invention permits a carrying cable or carrying chain, otherwise known as a carrying line, in the tubular shaft to be fastened and tensioned easily, and be made operational again before withdrawing the tubular-type pump.

The present invention includes an opening in the wall of the tubular shaft. This opening leads to a cavity which is sealed pressure-tight and which is situated outside the tubular shaft. A device for fastening the carrying cable or carrying chain of the tubular-type pump are situated in this cavity. The device for fastening the carrier cable or carrier chain can also be inserted into the frame provided for the lines and the sealing means.

A preferred embodiment of the present invention comprises an assembly comprising a tubular shaft having a first axial end and a second axial end and having means for housing within the shaft a tubular pump that is driven by an electric motor, a lid being detachably connected to the first axial ends of the shaft, at least one line being connected to the electric motor, the tubular shaft having an opening adjacent to the first axial end, a u-shaped frame being disposed within the opening such that an open part of the frame faces the first axial end, at least one line being disposed within line the frame or, means for sealing the at least one line being disposed within the frame to form a fluid tight seal about at least one line.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED OF THE PRESENTLY PREFERRED EXEMPLARY EMBODIMENT

Figure 1:
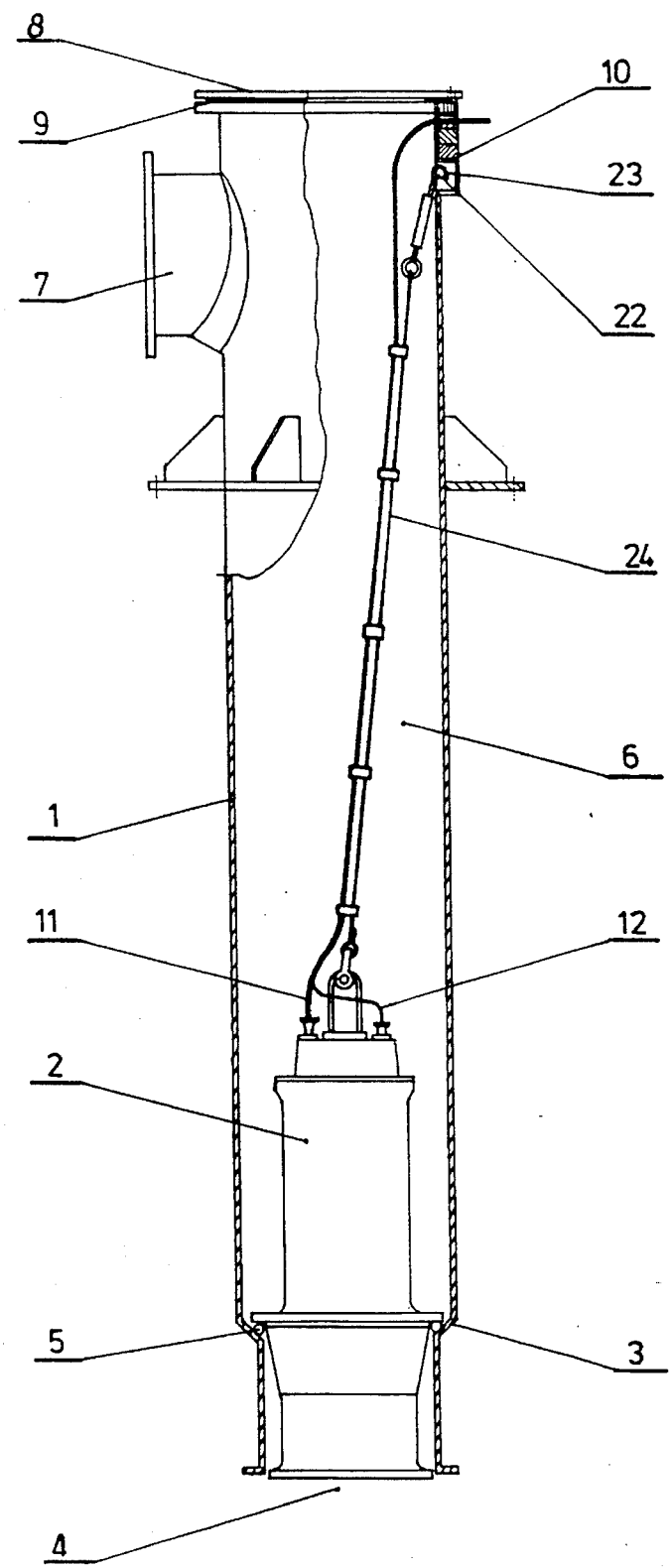
FIG. 1 shows a tubular shaft with a tubular-type pump disposed therein.

Referring now to FIG. 1, a tubular shaft 1 is illustrated. The tubular shaft 1 receives a tubular-type pump 2 on a radially inwardly projecting protrusion 3. The inlet or entry 4 of the tubular shaft 1 is situated below the tubular-type pump 2. A part 6 is situated above the tubular-type pump 2, and the pump 2 is sealed by a gasket 5 with respect to the wall of the tubular shaft 1. The part 6 forms a pressure connection piece of the tubular-type pump 2. The exit or outlet connection piece 7 of the tubular shaft 1 is disposed laterally and branches off from part 6. A lid 8 closes the tubular shaft 1. A flange gasket 9 is disposed between the lid 8 and the tubular shaft 1 to seal the tubular shaft 1 pressure-tight.

Figure 2:
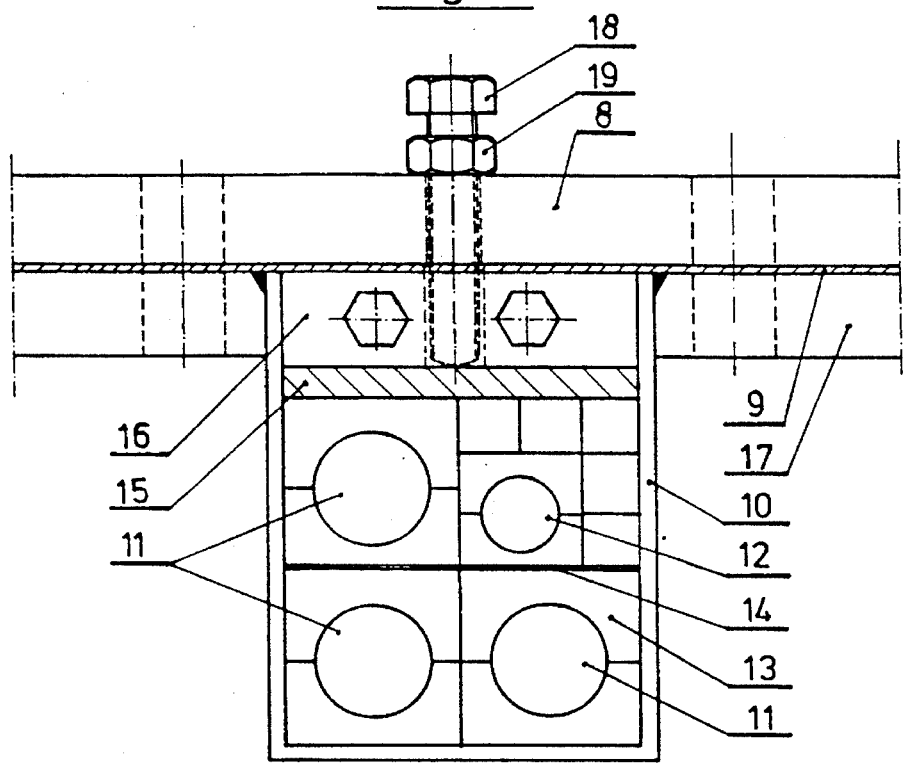
FIG. 2 shows an enlarged cut-out from FIG. 1, shown in a different view, and showing the frame which contains the line conduit.

Adjacent to a first axial end of the tubular shaft 1, an opening for the lines leading to the electric motor of the tubular-type pump 2 is disposed in the wall of the tubular shaft 1. A frame 10, open toward the top or first axial end, is preferably welded into this opening. (See FIG. 2). The power lines 11 and the control line 12 of the tubular-type pump 2, and sealing devices 13, which surround the lines 11 and 12, core plates 14, press plate 15, and a closure gasket 16 are inserted into the frame 10. The upper termination of the frame is formed by the lid 8, which is detachably connected to a flange 17 of the tubular shaft 1.

A set screw 18 threadably tightens down the press plate 15. Screw 18 is threadably connected to lid 8. A lock nut 19 secures the position of the set screw 18. If the cables are thin and few in number, the clamping apparatus, which includes the press plate 15, set screw 18, and lock nut 19, can be dispensed with.

Figure 3:
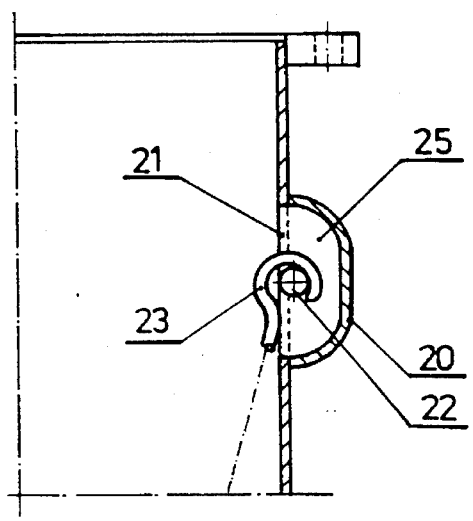
FIGS. 3 and 4 show two enlarged views of the fastening for the carrier cable of the tubular-type pump.
Figure 4:
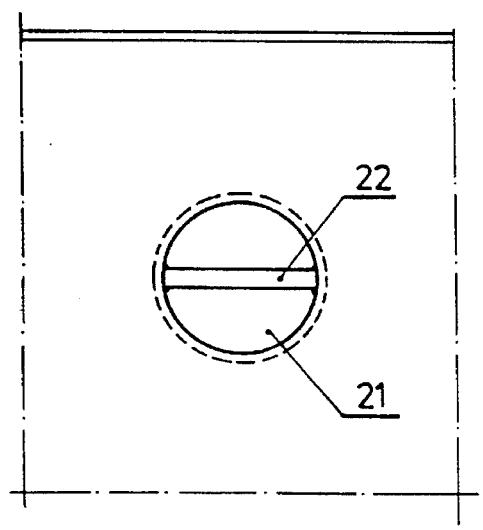

Referring now to FIGS. 3 and 4, an opening 21, closed by a cap 20, is situated in the wall of the tubular shaft 1, so as to provide access to a web 22. The cap 20 is welded pressure-tight to the outer wall of the tubular shaft 1. The cap 20 forms a cavity 25, which is accessible from the inside of the tubular shaft 1. The web 22 is intended to accommodate a turnbuckle hook 23, which is connected to a carrying cable 24, that is fastened to the tubular-type pump 2 (See FIG. 1). Besides functioning to lift and lower the tubular-type pump 2, the carrying cable 24 also acts as a guide for lines 11 and 12, which are fastened to it by fittings and clips.

The type of seal used for the line conduit is known, in principle, from electrical installations and from ship and machine construction. However, only frames set in or on a closed wall opening are used there. Consequently, the lines must always be conducted through such a frame. In principle, this corresponds to the manner of leading the lines through the wall of a tubular shaft, as described in the introduction. With the inventive design of the present invention, however, the lines 11, 12 can be inserted into an open u-shaped frame 10 when the lid 8 is removed, and can be withdrawing from there, thus making the difficult and complicated task of clamping and threading the frequently thick and hard-to-handle lines 11, 12 unnecessary. Additionally, connecting an opening that is only closed by the lid 8 to a press plate 15 that is tightened down over the lid 8 makes it possible to eliminate possibly developing leakage points quickly and without complication, by simply retightening the press plate 15, thus making it unnecessary to remove the lid 8 and the closure gasket 16.

From the foregoing description, it will be appreciated that the present invention makes available, a compact, cost efficient tubular shaft for tubular type pump. The shaft is designed to allow for simple operation of the lines leading to the electric motor.

Having described the presently preferred exemplary embodiment of a new and improved tubular shaft arrangement in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

What is claimed is:

1. An assembly comprising:

a tubular shaft having a first axial end and a second axial end and having means for housing within the shaft a tubular pump that is driven by an electric motor, said tubular shaft having an opening adjacent to the first axial end;

a lid being detachably connected to the first axial end of the shaft;

at least one line being connected to the electric motor;

a u-shaped frame being disposed within the opening such that an open part of the frame faces the first axial end, said at least one line being disposed within the frame;

means for simultaneously sealing the first axial end and said at least one line being disposed within the frame to form a fluid tight seal about the first axial end and said at least one line.

2. The tubular shaft according to claim 1, wherein the frame is closed by the lid.

3. The tubular shaft according to claim 2, further including a press plate and a flange gasket to seal the lid and the frame, and wherein at least one set screw being disposed in the lid to tighten down the press plate disposed within the open part of the frame.

4. The tubular shaft according to claim 1, wherein a second opening is disposed in the wall of the tubular shaft, such that the second opening communicates with a cavity that is disposed about the tubular shaft, means for fastening a carrying line of the tubular pump being disposed within the cavity.

5. The tubular shaft according to claim 4, wherein a web of shaft wall material is disposed in the second opening to fasten the carrying line.

6. A tubular-type pump according to claim 1, wherein means for fastening a carrying line of the tubular pump are attached to the frame.

* * * * *